May 7, 1963  H. L. BEILSTEN ET AL  3,088,240
ANIMATED LURE
Filed Jan. 5, 1959  2 Sheets-Sheet 1
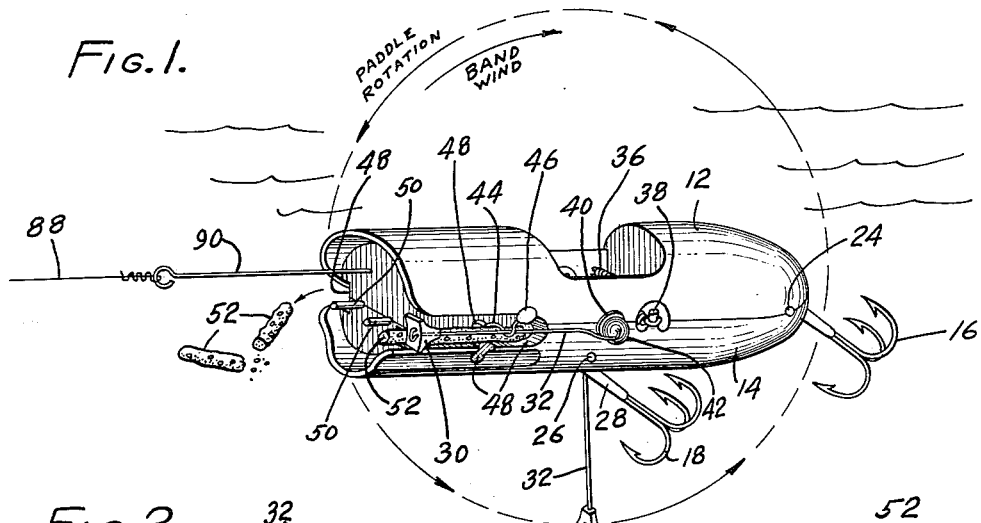
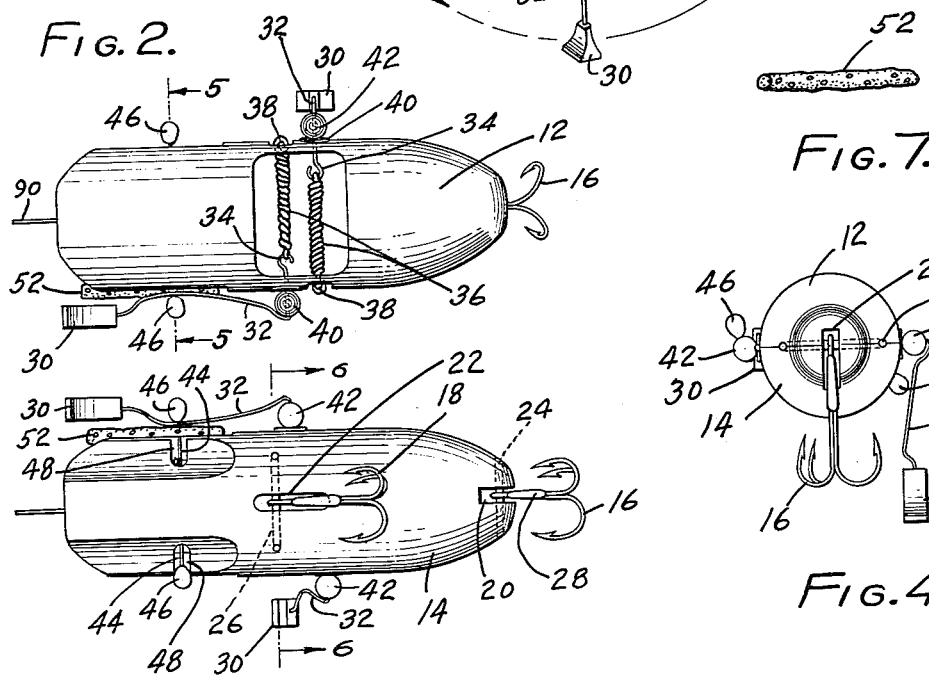
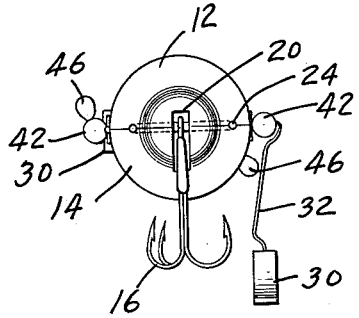
HARRY L. BEILSTEN
VICTOR CUPP
R. DAVID MURPHY
INVENTORS
BY Albert J. Fihe
ATTORNEY

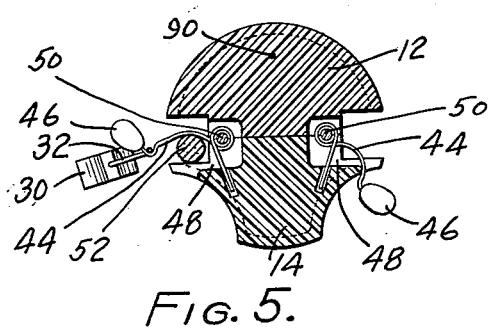
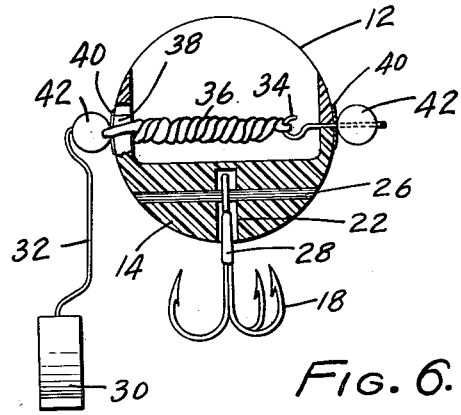
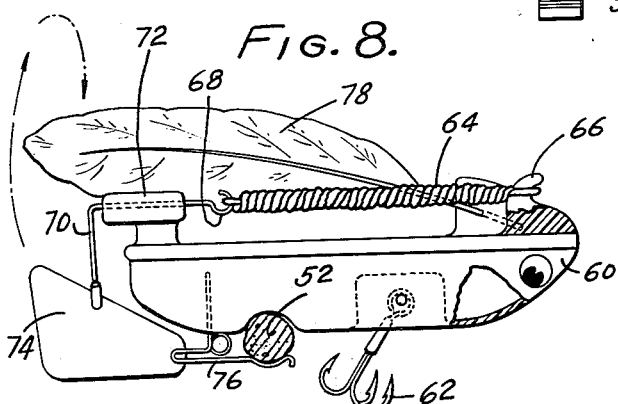
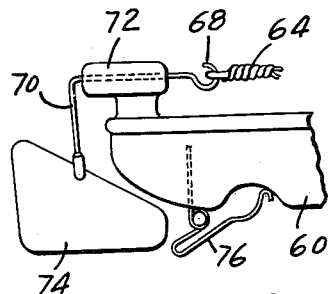
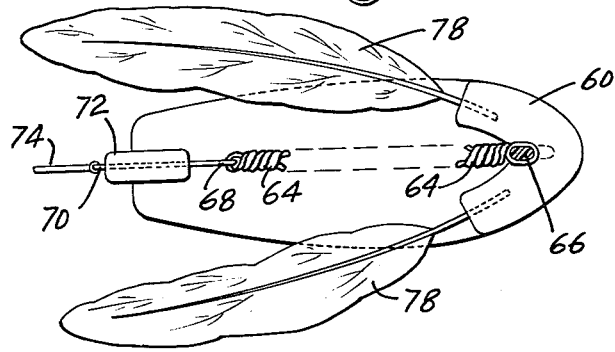
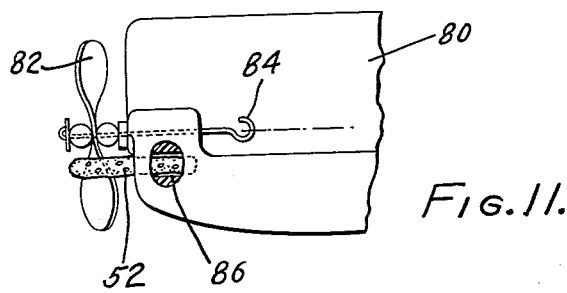

United States Patent Office 3,088,240
Patented May 7, 1963

3,088,240
ANIMATED LURE
Harry L. Beilsten, North Hollywood, Victor Cupp, Van Nuys, and Roy David Murphy, Granada Hills, Calif.; said Beilsten and said Cupp assignors to said Murphy
Filed Jan. 5, 1959, Ser. No. 785,016
1 Claim. (Cl. 43—26.2)

This invention relates to an animated lure for fishing purposes, and has for one of its principal objects the provision of a device of the class described which is particularly adapted for surface fishing and which includes a self-contained mechanical action and predetermined timing device.

One of the important objects of this invention is the provision of a fishing lure which can be constructed to resemble almost any type of live bait and which includes a mechanism for creating a self-contained motion which will simulate the motion of a living creature, such as a minnow, frog, bug, bird or even a small animal, such as a mouse.

Another object is to produce, in a lure, means for creating a skipping or wobbling action when the same is being reeled in by the fisherman subsequent to the original life-like simulated action.

A further object of the invention is to provide especially designed paddles or feet which will create a more efficient lure or bait action in addition to actually producing a sound when in operation besides the splashing movement.

Yet another object of the invention is the provision, in an animated lure, of a simple, yet effective, pre-set timing device, whereby the actual movement or animation will occur at some specified time after the lure has been cast and following an interval of complete rest on the surface of the water.

A particular object of the invention is to provide an animated lure having a very simple source of operating power therein in connection with an effective and easy method of pre-setting the operative source of power and which is so constructed that it will not become accidentally released during the casting movement.

Still another object of the present invention is to provide a fishing lure having audible and animated means which can be manufactured in large quantities at a relatively low cost.

Another object is the provision of an animated artifical fishing lure of the character indicated above which can be produced in various attractive, rugged and serviceable forms and which is capable of being easily and quickly assembled.

Still a further object of the invention is to provide a fish lure having movable parts which are relatively few in number and which will not easily become damaged or get out of working condition and which, furthermore, if so damaged, can be easily replaced with a minimum expenditure of time, trouble and material.

Yet another and further object of the invention is to provide a fish lure in conformity with the preceding objects, whereby a preliminary automatic motion is accomplished, followed by a further movement directly controlled by the fisherman, and which lure can be operated with equal facility on the surface, in the water or on the bottom.

Another and still further important object of the invention is to provide an animated lure with a novel and simplified body portion which may be formed of plastic material or the like, and which is so constructed that it will not be likely to become snagged on underwater obstacles.

Another and still further important object of the invention is to produce a new and simplified combination of hooks so mounted upon an animated lure that they will not interfere with each other or with the animation mechanism itself while in operation.

Other and further important objects of the invention will be apparent from the disclosures in the accompanying drawings and following specification.

The invention, in a preferred form, is illustrated in the drawings and hereinafter more fully described.

In the drawings:

FIGURE 1 is a perspective view of the improved artifical animated lure of this invention, showing in some detail the mechanism with its timing means.

FIGURE 2 is a top plan view of the structure of FIGURE 1.

FIGURE 3 is a bottom plan view of the lure, as shown in FIGURE 1.

FIGURE 4 is a front view of the animated lure of this invention, showing the same in one position of operation.

FIGURE 5 is a slightly enlarged sectional view, taken on the plane of the line 5—5 of FIGURE 2, looking in the direction indicated by the arrows.

FIGURE 6 is also a slightly enlarged section on the line 6—6 of FIGURE 3, looking in the direction indicated.

FIGURE 7 is a view of one type of soluble material which can be employed as a predetermined timing device for controlling the delayed action of the animated lure of this invention.

FIGURE 8 illustrates a slightly modified form of the invention and is partly in section.

FIGURE 9 is a top plan view of the lure of FIGURE 8.

FIGURE 10 is a view of a portion of the structure depicted in FIGURE 8, but showing the same after a release of the preliminarily set power means has been effected.

FIGURE 11 shows a further modification which embodies the principles of this invention.

As shown in the drawings:

The reference numerals 12 and 14 indicate generally the top and bottom portions, respectively, of the improved animated lure of this invention. The lure can be composed of any suitable material, such as wood, metal or plastic, but plastic is, at the moment, considered the most satisfactory because of easy molding and assembling qualities; and, furthermore, different and various colors mey be actually incorporated into the material with little or no difficulty in the process of manufacture. The top and bottom portions are usually cemented together by some suitable material after incorporation thereinto of the other working parts of the lure.

These working parts obviously include the essential hooks 16 and 18 positioned as shown in slots 20 and 22, respectively (FIGURE 3), and held in position by means of pins 24 and 26, respectively, which pins can be made of either metal or plastic, as occasion arises. These are preferably weedless hooks of the dual type and can be partially covered with some coloring material, such as green plastic 28, so as to add realism to the lure. The slots 20 and 22 are of such a width so as to allow the hooks free swinging movement in a single vertical plane with respect to the lure itself, but will prevent any sidewise or rocking movement which would interfere with the action of the mechanical portions of the lure.

These mechanical portions comprise essentially a pair of paddles or feet 30, preferably shaped as shown in FIGURE 1, but which obviously can be of different shapes, as desired or convenient. These feet are also preferably of some suitable plastic material susceptible of molding in large quantities and are fitted onto the ends of legs 32, which preferably comprise thin wires or rods bent to a desired shape, as best shown in FIGURES 2 to 4, inclusive.

These rods 32 terminate in inwardly bent ends provided with integral loops or hooks 34 (FIGURE 2). These hooks are adapted to receive the ends of rubber bands 36, the other ends of which bands are fastened onto studs or protuberances 38, preferably formed integral with the bottom molded portion 14 of the lure, as best shown in FIGURE 6.

Sequins or the like 40 surmount the inturned ends of the wires 32 to provide an additional bearing at the points of passing through openings in the lure body, and beads 42 are employed as spacers (FIGURE 6).

Referring now more particularly to FIGURES 2 and 5, it will be noted that a trigger is associated with each of the leg combinations 30—32, each trigger comprising essentially a piece of spring wire 44 bent into shape and having a bead or the like 46 on its outer end. These trigger elements are positioned in slots 48 formed in the joined lure bodies and are held in position by means of removable pivot pins 50 (FIGURE 1). These pins fit into juxtaposed slots in the two body portions which, when joined, form cyllindrical receptacles.

In order to pre-set the mechanism for moving the legs and feet combinations 30—32, the same are wound in a clockwise direction, as indicated in FIGURE 1, and this can be accomplished in any convenient manner, as by the finger of the operator or preferably by means of an ordinary nail, the head of which can be used to contact the rod or wire portion 32 for winding purposes. This also eliminates much of the danger of the operator's finger or hand contacting the hooks.

After winding to a desired degree, the rubber band assumes the under-tension position shown in FIGURE 2, and the trigger 44, with its bead 46, is then manually moved up under the leg 32 to the position shown in FIGURE 1. A rod or section of some soluble element, such as a piece of ordinary pretzel 52, is then pushed into the outer portion of the slot 48 under the uplifted trigger 44—46 (FIGURE 5). The same pre-setting operation is then accomplished with the other leg.

Any material which is water soluble can be used instead of the stick of pretzel 52, but this is mentioned as being obviously something which is available in quantity practically anywhere, and which usually possesses the desired soluble characteristics. Any chemical material which has the desired solubility can be employed either in the way of preliminarily formed sticks or even soluble gelatine capsules can be used with equal facility. If a faster action is desired, the pretzel or other soluble element can be preliminarily reduced in diameter, and ordinarily this is done with one of the sticks, whereby the associated leg motion will take place sooner than that of the other. This provides two separate delayed action movements, which often times is preferable.

When the lure is cast, the pressure exerted from the wound rubber band is applied to the pretzel, and when it begins to dissolve, the related portion of the trigger spring 44 cuts through the timer and releases the leg on that side for action. Staggered timing of the leg motion can also be achieved by variance of spring tensions, torque on the rubber band and timer slot arrangements.

In FIGURES 8, 9 and 10, a slightly modified form of the invention is illustrated, wherein a plug 60, provided with hooks 62, is equipped with a rubber band 64 fastened at one end on a protuberance 66 and connected at the other end to a hook 68, forming part of a wire 70 bent at right angles and mounted in a bearing support 72. The free end of this wire supports a paddle 74, and this paddle, after being wound, is restrained from rotation by a trigger spring 76 fixed in the body 60 and releasably locked in paddle-holding position by a section of pretzel or the like 52.

This plug may be equipped with simulated feathers or the like 78 or some other equipment so as to rememble an insect or bird. The released position of this modification of the invention is illustrated in FIGURE 10.

A still further modification is shown in FIGURE 11, wherein a different type of lure or even a toy boat 80 can be driven by means of a propeller 82, which is motivated by a rubber band on a hook 84 with the soluble pretzel stick or other release element 52 positioned in an opening 86 in the body for an obvious release action following dissolving.

It will be noted that, when the feed or paddles 30 on their supports 32 are wound against the tension of the resilient bands or similar elements 36, following positioning of the triggers 44—46 and the soluble element 52, there will be no possibility of accidental unwinding if the nail or other element used by the operator for winding happens to slip from the rod or wire 32. As will be evident from an inspection of FIGURE 1, the foot or paddle 30 will not be able to make more than one rotation, whereupon it will be caught by the bead 46 on the end of the rod 44 and accordingly retained in practically fully wound position. This relationship is also well illustrated in FIGURE 5.

Staggered or spaced timing of the release operation can be accomplished in many ways, such as by using different thicknesses of pieces of pretzel or other soluble element 52, or a permanent differential of timing release can be accomplished by making one of the slots 48 wider than the other. Obviously, the wider the slot, the faster will be the severing action of the spring element 44 on the pretzel stick 52.

It will be obvious that herein is provided a novel type of animated fishing lure which is equipped with preliminarily set and automatically operated mechanical movements simulating that of a wounded minnow, frog, insect, bird, mouse or other animal, and which can be so preliminarily timed that spasmodic action results, creating a much more natural illusion so far as the fish are concerned. An ordinary fishing line 88 and a leader or the like 90 is, of course, provided for the necessary fishing action.

We are aware that many changes may be made and numerous details of construction varied throughout a wide range without departing from the principles of this invention; and we, therefore, do not propose limiting the patent granted hereon otherwise than as necessitated by the prior art.

We claim as our invention:

An animated lure comprising:

a body adapted to support one or more hook elements and having recess means;

a pair of discrete shafts, each independently rotatable on a substantially parallel axis transverse to said body and in opposed relationship, each having an inner end extending into said recess means and an outer end extending outwardly of said body on opposite sides thereof;

discrete spring means in said recess means, each connected to one of said shafts and each being capable of being independently wound in response to independent rotation of said one of said shafts in one direction;

a paddle element secured to each of said outer ends of said shafts exteriorly of said body and each extending in a plane substantially normal to its shaft so as to be rotatable about the axis of its shaft;

said body having a pair of opposed second recess means, each adjacent one of said paddle elements and in communication with the exterior of said body;

a soluble detent element residing in each of said second recess means and each soluble at a predeterminable rate when immersed in water;

a spring-biased trigger element in each of said second recess means and movable transversely relative to each, each trigger element normally being spring-biased into one position non-engageable by an adjacent paddle element during rotation thereof under the influence of its respective wound spring means and positionable by an adjacent water soluble detent element residing in its respective second recess means into a second position engageable by its adjacent paddle element for holding said adjacent paddle element against rotation, each said trigger element being independently responsive to immersion of said body in water to dissolve its respective soluble detent element so as to release its individual trigger element whereby the released trigger element is spring-biased into said one position to disengage its adjacent paddle element for rotation by its respective spring means.

References Cited in the file of this patent

UNITED STATES PATENTS

| | | |
|---|---|---|
| 2,232,102 | Dudek | Feb. 18, 1941 |
| 2,468,877 | Horton | May 3, 1949 |
| 2,884,730 | Westerfield | May 5, 1959 |
| 2,922,244 | Benner | Jan. 26, 1960 |